2,877,176

PROCESS FOR REMOVING SULFUR AND AROMATICS FROM HYDROCARBONS USING ACTIVE CARBON IMPREGNATED WITH ALKALI METALS OR OXIDES THEREOF AS ADSORBENT

William F. Wolff, Park Forest, and Philip Hill, Lansing, Ill., assignors to Standard Oil Company, Chicago, Ill., a corporation of Indiana No Drawing. Application September 20, 1956
Serial No. 610,887

7 Claims. (Cl. 208—208)

This invention relates to the adsorption of aromatic hydrocarbons and organic sulfur compounds from hydrocarbon oils and in particular it concerns the use of improved adsorbents.

While activated carbon can be used for selectively adsorbing aromatic hydrocarbons and aromatic sulfur compounds from hydrocarbon oils, improved adsorbents which have a greater capacity for the adsorbed component are desired. It is a purpose of the present invention to provide an adsorbent which does have an increased capacity for aromatic hydrocarbons and organic sulfur compounds. Another object is to provide an improved capacity adsorbent containing specified amounts of certain alkali compounds, and which adsorbent can be regenerated for further use without substantial degradation of its adsorptive capacity. A further object of this invention is to provide an efficient and economic process for removing aromatic hydrocarbons and organic sulfur compounds from hydrocarbon oils which uses an improved adsorbent therefor.

It has been found that aromatic hydrocarbons and organic sulfur compounds can be selectively adsorbed in the liquid phase from hydrocarbon oils by using an activated carbon having extended thereon and therein between about 0.05 and 0.2 part of sodium, potassium, or the oxides thereof per part by weight of the activated carbon. The defined amounts of the specified alkali metals or alkali metal oxides improves the capacity of the activated carbon for the adsorbable compounds. The alkali metal-activated carbon adsorbent is prepared by stirring the proper quantity of molten alkali metal with the activated carbon under an inert atmosphere e. g. nitrogen, to obtain an extensive dispersion of alkali metal upon and within the activated carbon. To produce the alkali metal oxide-activated carbon adsorbent, the alkali metal-activated carbon adsorbent is contacted with a gas stream containing free oxygen preferably in a diluted form e. g. 2 to 5% oxygen. The adsorption of aromatic hydrocarbon and organic sulfur compounds is carried out by contacting a hydrocarbon oil such as a petroleum distillate containing the mentioned adsorbable compounds with our improved adsorbent, while maintaining the hydrocarbon oil in the liquid phase. Temperatures of from 0° to 100° C.; conveniently, atmospheric temperatures can be used. When it is necessary to regenerate the adsorbent, this may be done by heating the adsorbent containing adsorbed components to a temperature not higher than about 150° C. and preferably under reduced pressure. A preferred method for removing adsorbed sulfur compounds consists of washing the adsorbent with a hot hydrocarbon e. g. aromatic hydrocarbon which displaces the sulfur compounds, the hydrocarbons subsequently being removed by heating to an elevated temperature.

Our improved adsorbent is believed to consist of the alkali compound (alkali metal or alkali metal oxide) highly dispersed upon and within the activated carbon. In order to obtain the alkali compound-activated carbon adsorbent which has a greater adsorption capacity than activated carbon alone, it is essential that the alkali compound be a sodium or potassium compound. By the words "alkali compound" is meant sodium metal, potassium metal, sodium oxide, and potassium oxide. Lithium metal, in fact, decreases the adsorption capacity of the activated carbon and in all instances the addition of lithium renders the adsorbent's capacity poorer than that of activated carbon alone. Potassium metal increases the adsorptive capacity to a greater extent than does sodium metal. It is also essential that the improved adsorbent contain between about 0.05 to 0.2, for example, about 0.15 part of the alkali compound by weight per part by weight of the activated carbon. The use of less than 0.05 part of the alkali compound per part of activated carbon by weight causes only a slight increase in the adsorptive capacity. The presence of more than about 0.2 part of alkali compound per part of activated carbon by weight tends to reduce the adsorptive capacity to a point where increasing amounts of alkali compounds produce an adsorbent which has a lower capacity than the activated carbon itself.

Our alkali metal-activated carbon adsorbent is prepared by thoroughly mixing the melted alkali metal under an inert atmosphere e. g. nitrogen, helium etc., with the activated carbon particles until the alkali metal is thoroughly dispersed upon and within the activated carbon. For example, molten sodium or potassium metals can be stirred with the activated carbon using a nitrogen atmosphere and at temperatures on the order of 100° to 300° C. or thereabouts for about five minutes to one-half hour. The alkali metal becomes adsorbed on the activated carbon and the appearance of the finished adsorbent is about the same as that of the activated carbon initially employed. To prepare the alkali metal oxide-activated carbon adsorbent, the alkali metal-activated carbon adsorbent prepared as described above is treated with free oxygen. When the alkali metal-activated carbon is contained as a slurry in a hydrocarbon oil, concentrated free oxygen can be passed through the slurry to oxidize the alkali metal; whereas when treating the dry form of alkali metal-activated carbon adsorbent, a gas stream containing diluted free oxygen e. g. 2 to 5% free oxygen, is contacted with the dry alkali metal-activated carbon adsorbent. These techniques are used to avoid rapid increases in temperature and damage to the adsorbent. The advantage of employing the alkali metal oxide-activated carbon is that it contains alkali metal in a more stable form and therefore can be more easily and safely handled, but it does have a somewhat lower adsorptive capacity than the alkali metal-activated carbon adsorbent.

It is essential that activated carbon be used in preparing the adsorbent. Other forms of carbon, such as graphite, are relatively ineffective as conventional adsorbents and also in the preparation of the improved adsorbents of this invention. The active carbon used is that form conventionally and commercially known as "activated carbon." It is generally prepared by carbonizing bones, blood, cellulosic materials such as wood, corn cobs, fruit pits, sawdust, nut shells, such as coconut shells, and the like, at temperatures below 600° C. and in the absence of air. Activated carbons prepared from coconut shells are preferred for use in this invention. Thereafter the carbon produced is activated by a controlled oxidation with suitable gases, such as steam and/or carbon dioxide and/or air at temperatures between 400° and 900° C. Various activating materials such as zinc chloride, and the like, can be incorporated prior to the controlled oxidation step. The activated carbons have various adsorptive capacities due to differences in the raw materials from which manufactured and the differences in manufacturing techniques. Nevertheless, by incorporating the alkali compound the adsorptive capacity of any particular activated carbon is increased so that it is greater than the activated carbon from which it is prepared. Activated carbon generally has a total surface area between 500 and 1000 sq. m. per gm. While we do not wish to be bound by any theory, we believe that the sodium and/or potassium enters between the graphitic layers contained in the activated carbon and spreads them apart, thus permitting the aromatic hydrocarbons and/or organic sulfur compounds to enter and be adsorbed in spaces which they could not previously enter since their molecular diameter was larger than the opening available.

The adsorption of the aromatic hydrocarbons and/or organic sulfur compounds from a liquid hydrocarbon oil with our improved adsorbent is carried out under the conditions usually employed when using an activated carbon for this purpose. Thus temperatures of from 0° to about 100° C., conveniently atmospheric temperatures, can be used, but the conditions must be such that the hydrocarbon oil is maintained in the liquid phase when contacted with the adsorbent. Our adsorbent can be employed in the amount of about .01 to 10 volumes per volume of the oil containing the aromatic hydrocarbon and/or organic sulfur compound to be adsorbed; the amount of adsorbent used depending to some extent upon the concentration of the adsorbable components in the oil, the extent of removal thereof which is desired, the rate of contacting of the oil with the adsorbent etc. Generally the adsorbent will adsorb from about 0.1 to 0.5 volume of liquid per volume of adsorbent. Either batch or continuous adsorption techniques can be used. The adsorbent can be employed in the form of a fixed or moving bed of adsorbent particles. For example, the hydrocarbon oil can be passed through a fixed bed of adsorbent particles until the adsorbent becomes substantially spent for removing aromatic hydrocarbons and/or organic sulfur compounds, whereupon the flow of oil can be diverted to another vessel and the adsorption continued while regenerating or desorbing adsorbed components from the first vessel. Any of a wide variety of hydrocarbon oils such as petroleum oils boiling in the naphtha through the gas oil boiling range or even higher boiling oils can be contacted with our adsorbent. Our adsorbent is especially useful for treating petroleum distillates for removing organic sulfur compounds. It finds particular applicability in the treatment of low-sulfur stocks such as naphthas which contain from .001 to 0.05 weight percent sulfur which cannot be easily removed therefrom by conventional hydrodesulfurization processes. Since the organic sulfur compounds are more strongly adsorbed by our adsorbent, it is also possible to selectively remove organic sulfur compounds from a rather highly aromatic hydrocarbon oil. While sodium dispersed on high surface supports has been used in the vapor phase desulfurization of hydrocarbon oils, our process differs therefrom in that sulfur compounds are adsorbed in our process rather than reacted with the sodium. Thus in the prior art vapor phase desulfurization processes the sodium on the supports becomes spent whereas our adsorbent can be regenerated by removing the sulfur compounds and the adsorbent reused.

When the need arises to regenerate the adsorbent, usually when it is not capable of adsorbing much additional aromatics or organic sulfur compounds, the adsorbed components can be desorbed in general by heating the spent adsorbent to a temperature not higher than about 150° C. while preferably maintaining the spent adsorbent under conditions of reduced pressure e. g. subatmospheric pressures. The temperature employed in desorption should be limited to about 150° C., especially when desorbing organic sulfur compounds because reaction between the sulfur compound and the alkali metals occurs to a substantial extent at higher temperatures. When desorbing aromatic hydrocarbons, temperatures of 200° C. or even higher may be used. When desorbing organic sulfur compounds the use of temperatures on the order of 200° C. produces an adsorbent which is still capable of adsorbing sulfur compounds to a greater extent than would the activated carbon, but to a lesser extent than the adsorbent which is regenerated at a temperature below 150° C. A desirable method of desorbing the sulfur compounds from the adsorbent consists of washing the spent adsorbent with hot hydrocarbons e. g. hot aromatic hydrocarbons to displace the sulfur compounds. The regenerated adsorbent containing aromatic hydrocarbons can then be used for adsorbing sulfur compounds from a hydrocarbon oil since the sulfur compounds will displace the aromatic hydrocarbons contained in the regenerated adsorbent.

Experiments were carried out which illustrated the fact that our adsorbent is capable of adsorbing larger amounts of aromatic hydrocarbons and organic sulfur compounds from an oil than can be obtained by using the activated carbon alone. Parallel experiments were carried out using activated coconut charcoal (Sargent's) and the same charcoal containing approximately 0.14 part of sodium metal per part of charcoal. The alkali metal activated charcoal adsorbent was prepared by mixing 1.9 gms. of molten sodium with 13.7 gms. of the activated coconut charcoal under a nitrogen atmosphere at about 150–200° C. for about one-half hour. In the parallel experiments approximately 35–45 gms. of liquid toluene-n-heptane mixtures (containing toluene concentrations varying from 7 to 75 by weight) were stirred under a nitrogen atmosphere with about 16 gms. of the adsorbent at about room temperature. Weighed portions of the supernatant equilibrium liquid were withdrawn and analyzed to determine the concentration of toluene and n-heptane. This enabled calculations of the capacity and selectivity of the adsorbents for toluene by using the method set forth by Rowe, "Adsorption Separation Factors and Adsorbent Capacities for Binary Liquid Mixtures," Ph. D. (thesis, Penn. State Univ. (1955). It was determined that when using either the alkali metal-activated charcoal adsorbent or the activated charcoal alone as the adsorbent the selectivity was essentially the same i. e. the alpha value for toluene was about 8.7. However, the capacity of the activated charcoal was 0.203 cc./gm. whereas the capacity for the alkali metal-activated charcoal adsorbent was 0.276 cc./gm. Thus our adsorbent has a capacity which is about 36% greater than the activated charcoal.

An additional series of experiments was carried out in parallel experiments using activated charcoal, sodium metal-activated charcoal, and sodium oxide-activated charcoal for the adsorption of n-propyl sulfide from a hydrocarbon oil. The experiments were conducted by percolating a solution of 1% n-propyl sulfide in n-heptane through columns of the adsorbent. In run No. 3 the n-propyl sulfide solution was passed through a bed of about 14 gms. of dried charcoal (containing no alkali compound) and the first 19 cc. of percolate were analyzed to determine the amount of n-propyl sulfide removed therefrom. In run No. 4 the solution of n-propyl sulfide was percolated through a bed of sodium metal-activated charcoal adsorbent which was prepared in the manner described in previous experiments and which contained about 0.14 part of sodium metal per part of charcoal (the adsorbent used contained 2.0 gms. of sodium and 13.8 gms. of charcoal). The first 21.5 cc. of percolate were collected and analyzed to determine the n-propyl sulfide content. In run No. 5 a similar quantity of the adsorbent as used in run No. 4 was treated with a diluted solution of free oxygen in gaseous nitrogen until no further heat evolution was noted. Thereafter the solution of n-propyl sulfide was passed through the column of adsorbent and the first 19 cc. of percolate was analyzed to determine the amount of n-propyl sulfide therein. All of the percolations were carried out at room temperature. The results obtained are shown in Table I which follows:

Table I

| Run No. | Adsorbent | Percentage n-Propyl Sulfide Removed |
|---|---|---|
| 3 | Charcoal | 22 |
| 4 | Sodium-Charcoal | 96-97 |
| 5 | Sodium oxide-Charcoal | 56 |

It is evident from the above results that the 96-97% removal of n-propyl sulfide in run No. 4 shows that the sodium metal-activated charcoal is far superior to charcoal alone as an adsorbent. The sodium oxide-activated charcoal adsorbent used in run No. 5 is also greatly superior to the activated charcoal alone which was employed in run No. 3.

Thus having described our invention what is claimed is:

1. A process for the removal of aromatic hydrocarbons and organic sulfur compounds from hydrocarbon oils which comprises contacting in the liquid phase at a temperature below about 100° C. a hydrocarbon oil containing at least one compound selected from the group consisting of aromatic hydrocarbons, organic sulfur compounds and mixtures thereof with an activated carbon adsorbent containing between about 0.05 and 0.2 part by weight of at least one alkali compound selected from the group consisting of sodium, potassium, and the oxides thereof per part by weight of the activated carbon, the alkali metal-activated carbon adsorbent being prepared by mixing molten alkali metal with the activated carbon under an inert atmosphere to obtain a dispersion of alkali metal upon and within the activated carbon, and the alkali metal oxide-activated carbon adsorbent being prepared by contacting the alkali metal-activated carbon adsorbent with free oxygen.

2. The process of claim 1 wherein the alkali compound is potassium metal.

3. The process of claim 1 wherein the activated carbon is activated coconut charcoal.

4. The process of claim 1 wherein the hydrocarbon oil is a petroleum distillate.

5. A process for the removal of organic sulfur compounds from hydrocarbon oils which comprises contacting the hydrocarbon oil containing organic sulfur compounds in the liquid phase at a temperature between about 0° and 100° C. wth an activated carbon adsorbent containing between about 0.05 and 0.2 part by weight of at least one alkali compound selected from the group consisting of sodium, potassium, and the oxides thereof per part by weight of the activated carbon, the alkali metal-activated carbon absorbent being prepared by mixing molten alkali metal with the activated carbon under an inert atmosphere to obtain a dispersion of alkali metal upon and within the activated carbon, and the alkali metal oxide-activated carbon adsorbent being prepared by contacting the alkali metal-activated carbon adsorbent with free oxygen.

6. The process of claim 5 wherein the hydrocarbon oil is a petroleum distillate and wherein the adsorbent contains approximately 0.15 part by weight of potassium metal per part by weight of activated coconut charcoal.

7. The process of claim 5 wherein the hydrocarbon oil is a petroleum distillate and wherein the adsorbent contains approximately 0.15 part by weight of sodium oxide per part by weight of activated coconut charcoal.

References Cited in the file of this patent
UNITED STATES PATENTS

| 2,481,300 | Engel | Sept. 6, 1949 |
| 2,577,824 | Stine | Dec. 11, 1951 |